US012310529B2

United States Patent
Lee et al.

(10) Patent No.: US 12,310,529 B2
(45) Date of Patent: May 27, 2025

(54) COOKING POT LID

(71) Applicants: NAMILUNT, Daegu (KR); Jun Hee Lee, Daegu (KR); Rae Jung Lee, Suwon-si (KR)

(72) Inventors: Jun Hee Lee, Daegu (KR); Rae Jung Lee, Suwon-si (KR)

(73) Assignees: NAMILUNT, Daegu (KR); Jun Hee Lee, Daegu (KR); Rae Jung Lee, Suwon-si (KR)

( * ) Notice: Subject to any disclaimer, the term of this patent is extended or adjusted under 35 U.S.C. 154(b) by 0 days.

(21) Appl. No.: 18/534,759

(22) Filed: Dec. 11, 2023

(65) Prior Publication Data

US 2025/0120538 A1    Apr. 17, 2025

(30) Foreign Application Priority Data

Oct. 17, 2023  (KR) .................. 10-2023-0138373
Nov. 29, 2023  (KR) .................. 10-2023-0168831

(51) Int. Cl.
*A47J 36/06*     (2006.01)
*A47J 27/56*     (2006.01)
*A47J 45/06*     (2006.01)

(52) U.S. Cl.
CPC .............. *A47J 36/06* (2013.01); *A47J 27/56* (2013.01); *A47J 45/063* (2013.01)

(58) Field of Classification Search
CPC .......... A47J 36/06; A47J 27/56; A47J 45/063; A47J 27/58; A47J 36/38; A47J 27/092; A47J 45/074
See application file for complete search history.

(56) References Cited

U.S. PATENT DOCUMENTS

2019/0021537 A1 *  1/2019  Park .................. A47J 27/09

FOREIGN PATENT DOCUMENTS

| KR | 20100055189 A | * | 5/2010 |
| KR | 20140011749 A | * | 7/2012 |
| KR | 10-1518279 B1 |   | 5/2015 |

* cited by examiner

Primary Examiner — Don M Anderson
(74) Attorney, Agent, or Firm — Revolution IP, PLLC

(57) ABSTRACT

According to the present invention, a cooking pot lid includes: a body having a center protruding upward; a handle located at the center of the body and including a first opening opened downward and a second opening opened upward; an overflow prevention cap disposed inside the handle and placed on the first opening; and a cover coupled to the handle to guide the overflow prevention cap not to be easily separated therefrom, and having a through-hole for alleviating an internal pressure.

5 Claims, 5 Drawing Sheets

COOKING POT LID

BACKGROUND OF THE INVENTION

1. Field of the Invention

The present invention relates to a cooking pot lid, and more specifically, to a cooking pot lid capable of preventing food from overflowing during cooking.

2. Description of the Related Art

Generally, a cooking pot includes a pot in which food is accommodated and a lid disposed on the pot.

Soup, stew, or the like may be cooked in the pot, and the lid enables rapid cooking and prevents the food from splashing out during boiling.

Meanwhile, when the cooking pot lid is used while being installed on the pot, the food easily splashes out due to an internal pressure, and in order to prevent this problem, a device for alleviating the pressure may be provided.

However, the conventional cooking pot lid has a very complicated structure for alleviating the internal pressure, it is difficult to manufacture, and most of all, is difficult to wash, resulting in hygiene problems.

Patent Document

Korean Registered Patent No. 10-1518279

SUMMARY OF THE INVENTION

An object of the present invention is to provide a cooking pot lid having a new structure.

In addition, another object of the present invention is to provide a cooking pot lid that is easy to manufacture and wash while preventing food from overflowing during cooking.

According to the present invention, a cooking pot lid includes: a body having a center protruding upward; a handle located at the center of the body and including a first opening that is open downward and a second opening that is open upward; an overflow prevention cap disposed inside the handle and placed over the first opening; and a cover coupled to the handle to guide the overflow prevention cap not to be easily separated, and having a through-hole for relieving an internal pressure.

According to the present invention, it is possible to provide a cooking pot lid having a new structure.

In addition, according to the present invention, it is possible to provide a cooking pot lid that is easy to manufacture and wash while preventing food from overflowing during cooking.

DETAILED DESCRIPTION OF THE INVENTION

The present embodiment will be described in detail with reference to the accompanying drawings, but is not limited or specified by the present embodiment. In describing the present invention, a detailed description of known functions or configurations may be omitted in order to clarify the gist of the present invention.

Figure 1:
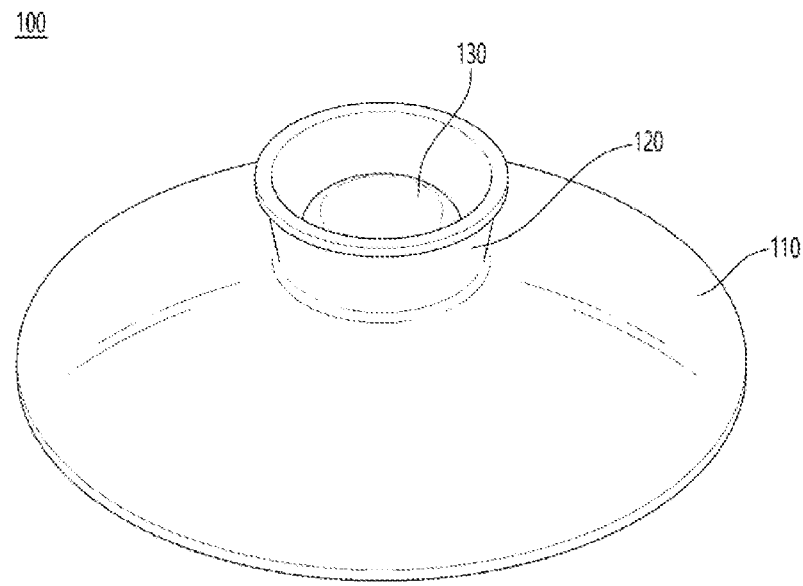
FIG. 1 is a perspective view of a cooking pot lid according to the present invention.
Figure 2:
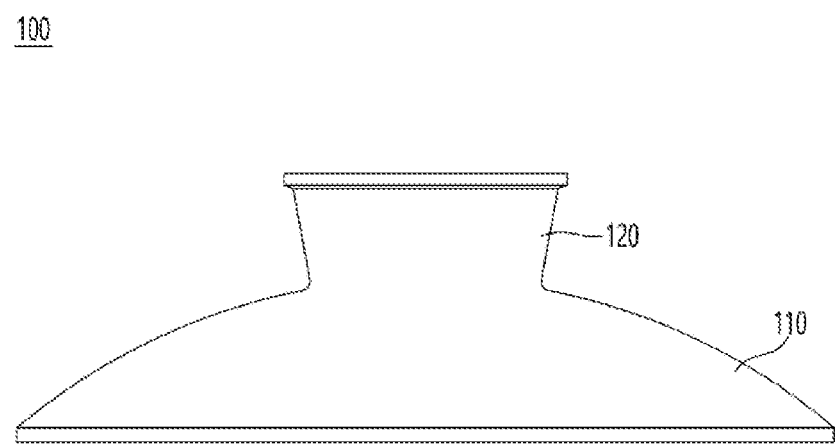
FIG. 2 is a side view of the cooking pot lid according to the present invention.
Figure 3:
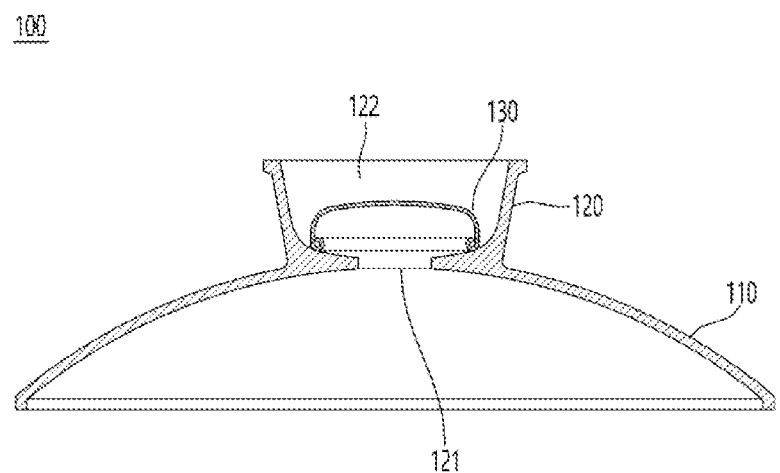
FIG. 3 is a sectional view of the cooking pot lid according to the present invention.
Figure 4:
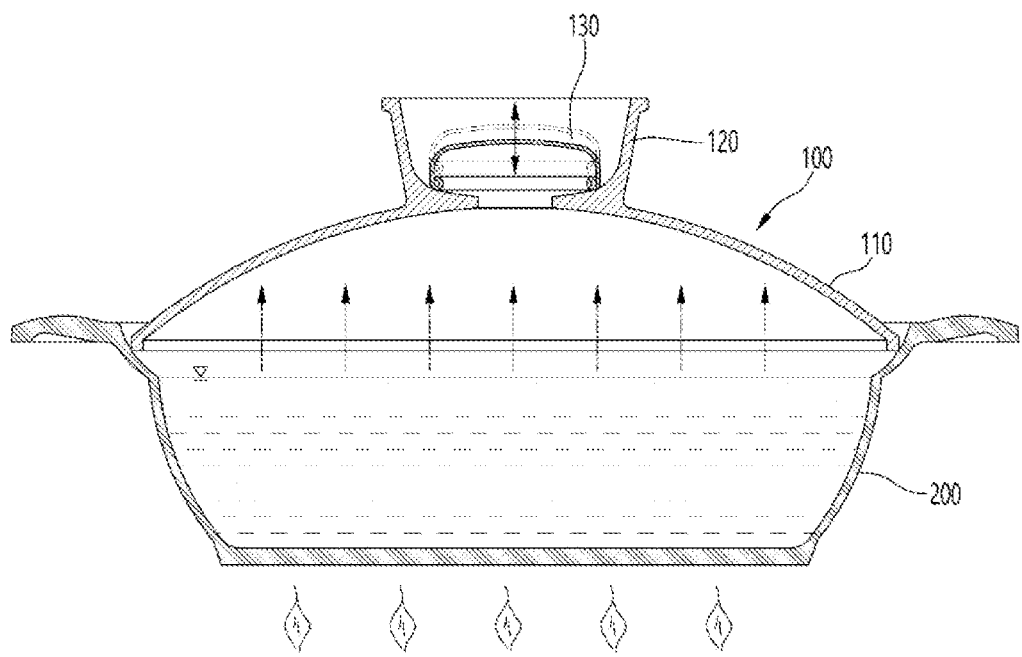
FIG. 4 is a view explaining installation of the cooking pot lid on a pot according to the present invention.

FIG. 1 is a perspective view of a cooking pot lid according to the present invention, FIG. 2 is a side view of the cooking pot lid according to the present invention, FIG. 3 is a sectional view of the cooking pot lid according to the present invention, and FIG. 4 is a view explaining installation of the cooking pot lid on a pot according to the present invention.

Referring to FIGS. 1 to 4, a cooking pot lid 100 according to the present invention includes a body 110 and a handle 120 located at the center of the body 110. The body 110 may be formed in a convex shape having the center protruding upward, or may be formed in a shape in which the center protrudes upward compared to an edge.

The handle 120 includes a first opening 121 that is formed at the center of the body 110 and open downward the body 110, and a second opening 122 that is open upward of the body 110. The first opening 121 has a smaller area than the second opening 122.

In addition, an overflow prevention cap 130 is installed inside the handle 120. The overflow prevention cap 130 is formed in a convex shape protruding upward and is open downward.

The body 110, the handle 120, and the overflow prevention cap 130 may be formed of a metal material, a ceramic material, or the like.

The body 110 and the handle 120 may be integrally formed of one material. An upper portion of the handle 120 protrudes outward in a horizontal direction to prevent the handle 120 from being easily lost when the user holds the handle 120.

The overflow prevention cap 130 covers the first opening 121 of the handle 120. A lower portion of the overflow prevention cap 130 makes contact with a circumference of the first opening 121.

As shown in FIG. 4, when food is put in a pot 200 and cooked, the cooking pot lid 100 according to the present invention covers a top of the pot 200.

An overflow prevention cap 130 is installed in the handle 120 of the cooking pot lid 100 to block the first opening 121.

The overflow prevention cap 130 is disposed at a position higher than the highest portion of the body 110 and is seated in the handle 120. A height of the overflow prevention cap 130 may be higher than 20% and lower than 80% of a height of the handle 120.

In addition, an area of the overflow prevention cap 130 is larger than the first opening 121 and smaller than the second opening 122.

Therefore, when an internal pressure between the pot 200 and the cooking pot lid 100 does not reach a predetermined pressure, the overflow prevention cap 130 blocks the first opening 121 to maintain the internal pressure. In addition, when the pressure is increased due to the boiling of the food, the overflow prevention cap 130 is moved in a bouncing manner due to the pressure to relieve the internal pressure.

In this case, the food may be partially overflowed through the first opening 121, and according to the present invention, since a height of the circumference of the first opening 121 decreases as the circumference is closer to the first opening 121, the food overflowed through the first opening 121 is introduced to an inner side between the pot 200 and the cooking pot lid 100.

Meanwhile, according to the present invention, the overflow prevention cap 130 is not fixed or coupled to the body 110 or the handle 120. Therefore, the handle 120 may be easily separated, and the body 110 or the overflow prevention cap 130 may be very easily washed.

Figure 5:
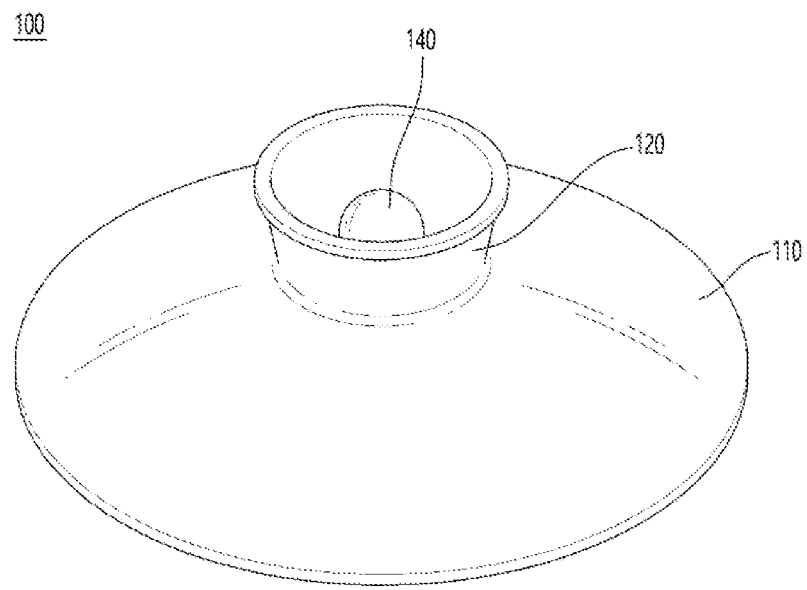
FIG. 5 is a perspective view of the cooking pot lid according to the present invention.
Figure 6:
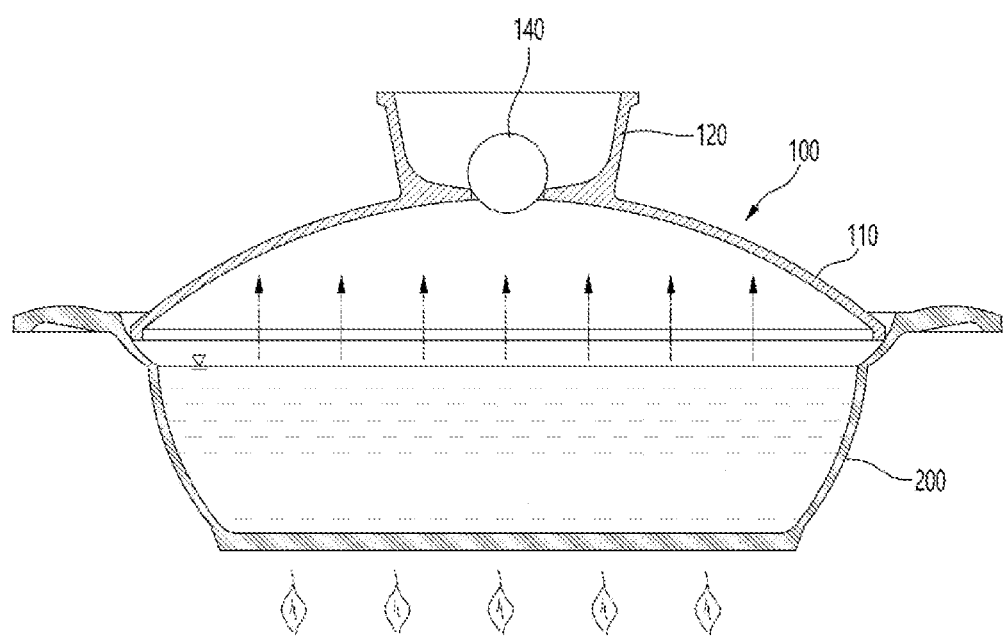
FIG. 6 is a view explaining installation of the cooking pot lid on a pot according to the present invention.

FIG. 5 is a perspective view of the cooking pot lid according to the present invention, and FIG. 6 is a view explaining installation of the cooking pot lid on the pot according to the present invention.

In FIGS. 5 and 6, the overflow prevention cap 140 is formed in a shape different from that shown in FIGS. 1 to 4. The overflow prevention cap 140 is formed in a spherical shape to block the first opening 121.

When the internal pressure between the pot 200 and the cooking pot lid 100 does not reach the predetermined pressure, the overflow prevention cap 140 closes the first opening 121 to maintain the internal pressure. In addition, when the pressure is increased due to the boiling of the food, the overflow prevention cap 140 is moved in a bouncing manner due to the pressure to relieve the internal pressure.

Figure 7:
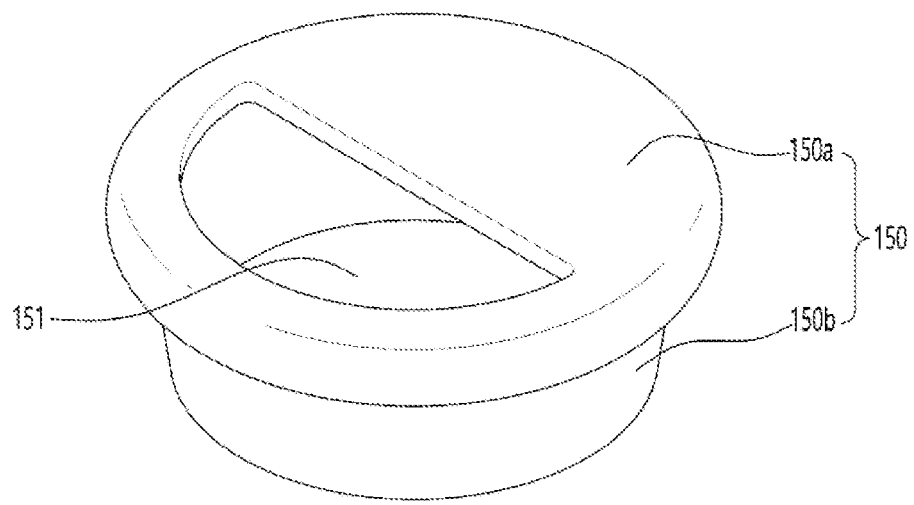
FIG. 7 is a view illustrating a cover coupled to the cooking pot lid according to the present invention.
Figure 8:
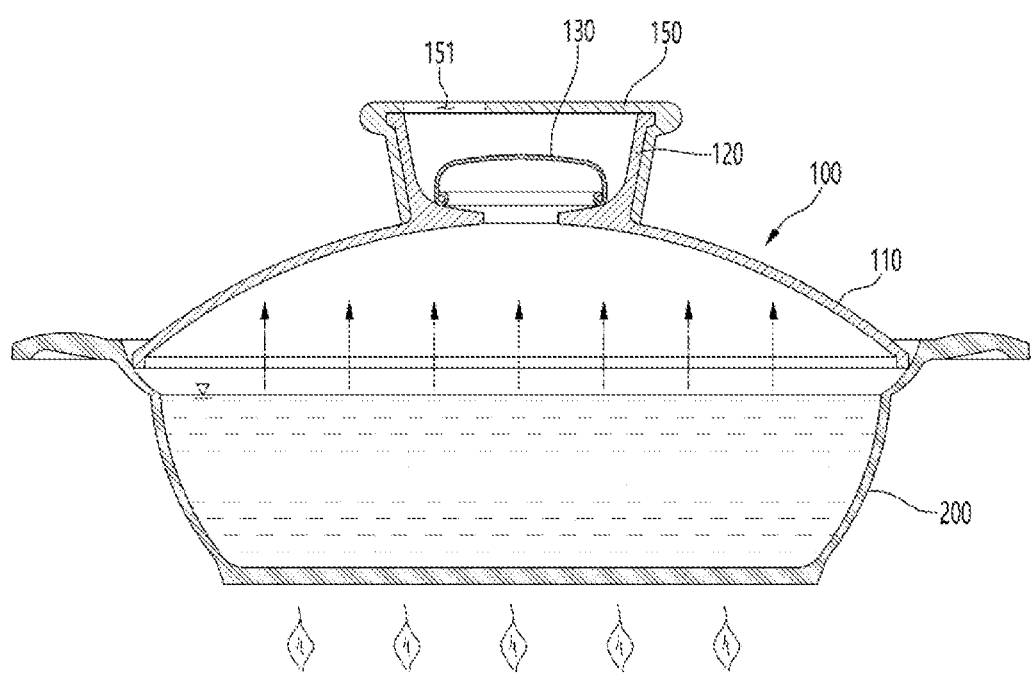
FIGS. 8 and 9 are views illustrating a state in which the cover and an overflow prevention cap are coupled to the cooking pot lid.
Figure 9:
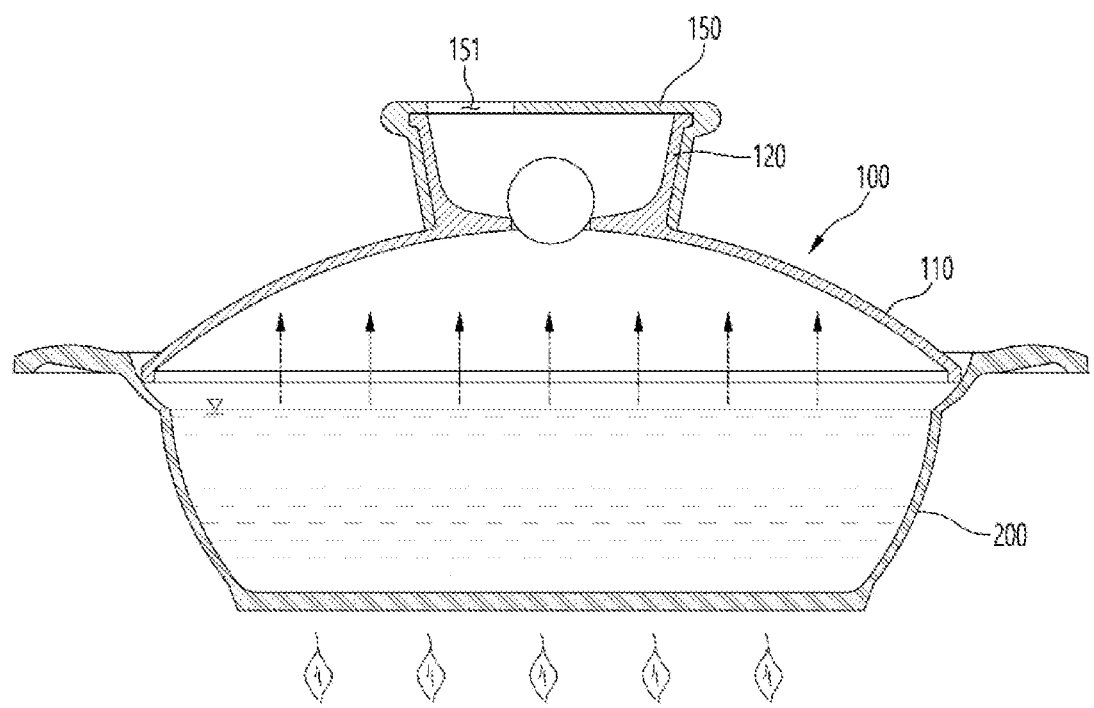

FIG. 7 is a view showing a cover coupled to the cooking pot lid according to the present invention, and FIGS. 8 and 9 are views showing a state in which the cover and the overflow prevention cap are coupled to the cooking pot lid.

Referring to FIGS. 7 to 9, a cover 150 coupled to the cooking pot lid 100 is coupled to the handle 120 of the cooking pot lid 100.

The cover 150 includes an upper surface member 150a and a side surface member 150b, in which the upper surface member 150a partially covers the second opening 122 of the handle 120, and the side surface member 150b surrounds a side surface of the handle 120.

The cover 150 may be formed of a synthetic resin or a synthetic rubber material having appropriate elasticity, and the cover 150 may be separated from or coupled to the handle 120 by the user.

The cover 150 serves to guide the overflow prevention caps 130 and 140 so as not to be easily separated or overturned to an outside of the handle 120, and protects the user's hand from the hot handle 120 when the user grips the handle 120.

A through-hole 151 is partially formed in the upper surface member 150a of the cover 150 to discharge hot heat generated through the first opening 121 to the outside.

The through-hole 151 may be formed in various shapes, and in the present embodiment, it is exemplified that it is formed in a semicircular shape. The through-hole 151 may be formed in a shape and size in which the overflow prevention caps 130 and 140 do not easily come out.

As described above, the cooking pot lid according to the present invention has the overflow prevention caps 130 and 140 with a simple structure so that the pressure inside the pot is relieved to prevent the food from overflowing to the outside.

In addition, the cooking pot lid according to the present invention further includes the cover 150, thereby preventing the overflow prevention caps 130 and 140 from being easily separated and protecting the user's hand from burns.

Although the above description has focused on the embodiments, this is merely an example and does not specify the present invention, and it will be understood by those skilled in the art to which the present invention pertains that various modifications and applications not exemplified above may be made without departing from the essential features of the present: invention. For example, each component specifically shown in the embodiment may be modified and implemented. Further, the differences related to the modifications and the applications should be interpreted as being included in the scope of the present invention defined in the appended claims.

What is claimed is:

1. A cooking pot lid comprising:
a body having a center protruding upward;
a handle located at the center of the body and including a first opening that is open downward and a second opening that is open upward;
an overflow prevention cap disposed inside the handle and placed over the first opening; and
a cover coupled to the handle to guide the overflow prevention cap not to be separated therefrom, and having a through-hole for alleviating an internal pressure,
wherein the overflow prevention cap is formed in a spherical shape,
wherein a portion of the overflow prevention cap is protruded downwardly from the handle and located on a same plane as a bottom of the body.

2. The cooking pot lid of claim 1, wherein an area of the overflow prevention cap is larger than the first opening and smaller than the second opening.

3. The cooking pot lid of claim 1, wherein a height of the overflow prevention cap is higher than 20% and lower than 80% of a height of the handle, so that the overflow prevention cap is seated in an inner space of the handle.

4. The cooking pot lid of claim 1, wherein the cover includes an upper surface member partially covering the second opening of the handle, and a side surface member surrounding a side surface portion of the handle.

5. The cooking pot lid of claim 1, wherein the cover includes an upper surface member having a circular shape and the through-hole formed in the upper surface member having a semicircular shape.

* * * * *